United States Patent Office 2,731,067
Patented Jan. 17, 1956

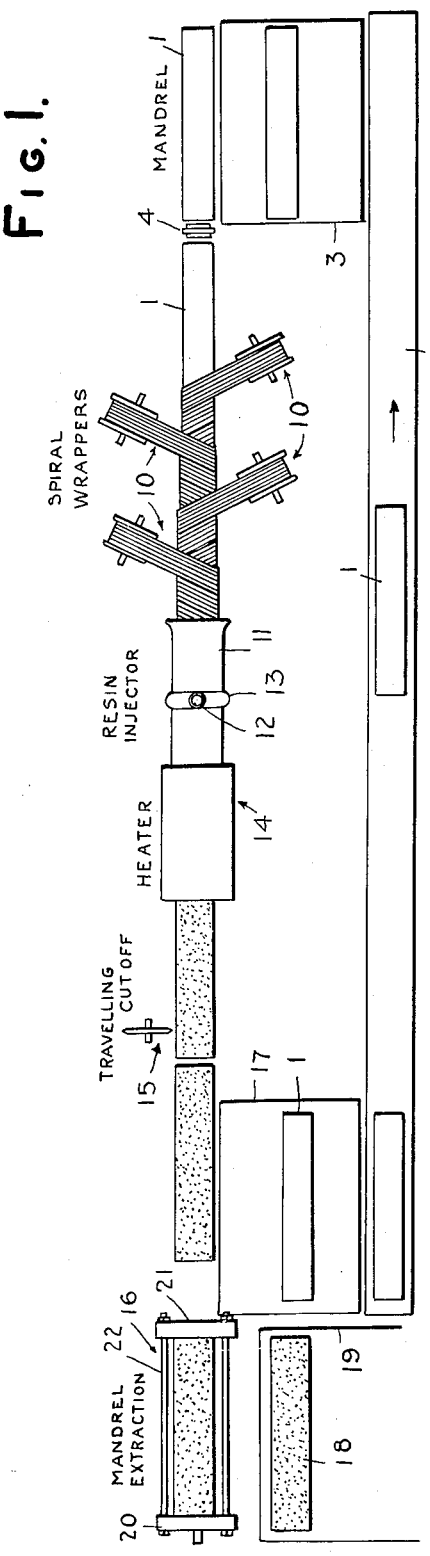

2,731,067

METHOD AND APPARATUS FOR MAKING FIBER GLASS PIPE

Roy G. Miller, Bayside, N. Y., assignor to East Coast Aeronautics, Inc., Mount Vernon, N. Y., a corporation of New York Application November 20, 1950, Serial No. 196,605

10 Claims. (Cl. 154—1.7)

This invention relates to reinforced plastic or synthetic resin pipe and to a method and apparatus for its manufacture.

Synthetic resin pipe has many advantages such as lightness and resistance to corrosion by contact with the earth and a variety of fluids but as heretofore constructed has been expensive and has not developed its full potential strength. Reinforcement of the synthetic resin has been accomplished, for instance, by wrapping a mandrel with fiber glass mat or fabric, impregnating with resin and oven curing to a solid state. Pipe made in this way has been found to have a tensile strength of the order of 20,000 p. s. i. where mat is used and 70,000 p. s. i. where woven fabric is used.

An object of my invention is to provide plastic pipe reinforced with glass fiber and which has a tensile strength of the order of 150,000 p. s. i. Such pipe may be substituted for welded steel pipe of the same diameter but weighing about 10 times as much.

Briefly, my invention resides in the manufacture of pipe by wrapping unidirectional glass fiber on a mandrel, impregnating the wrapped mandrel with a thermo-setting synthetic resin or plastic in fluid form, solidifying the resin and removing the mandrel from the resulting pipe.

A further object of my invention is to provide a continuous process in which a mandrel or mandrels move continuously through a series of steps, the pipe sections being continuously discharged at one point and the mandrels being returned to the circuit.

I have found that by wrapping a mandrel with glass fibers at an angle of about 63.4° to the axis of the mandrel, enveloping the wrapped mandrel in liquid thermosetting resin within a mold, setting the resin by heating and stripping the so-formed pipe from the mandrel that I can continuously produce pipe of any desired uniform size having an optimum proportioning between hoop and longitudinal stresses to provide a maximum ratio between strength and weight.

The reinforcing glass fiber may be wound around the mandrel in the form of a ribbon of parallel strands. It may form a single layer in which all of the fibers extend in the same direction, but for maximum effectiveness there must be two or more layers in which the fibers in alternate layers extend in opposite directions or the strands or ribbon of strands extending around the pipe in one direction may be interlaced with strands or ribbon extending around the mandrel in the opposite direction it being understood that all strands whether extending around the mandrel in a right hand or left hand helix intersect a plane lying in the axis of the mandrel at an angle of 63.4° or they intersect a plane perpendicular to the axis of the mandrel at an angle of about 26.6°. The strands of the right hand helix intersect the strands of the left hand helix at an angle of about 53.2°. Reinforcing fibers disposed at this angle are adapted to provide the best distribution of strength to resist the stresses normally occurring in a pipe subjected to internal fluid pressure, i. e., hoop stresses equal to twice the longitudinal stresses.

Referring to the accompanying drawings:

Fig. 1 diagrammatically illustrates the arrangement of the essential parts of an apparatus or plant for the manufacture of reinforced plastic pipe in accordance with the invention;

Fig. 2 is a fragmentary sectional view of a joint between the ends of two mandrel sections;

Fig. 3 is a fragmentary sectional view of another form of joint between two mandrel sections;

Fig. 4 is a fragmentary sectional view showing the mandrel, wrapped with glass fiber and positioned within a mold where it is surrounded by fluid or plastic thermosetting resin; and Fig. 5 is a sectional view of apparatus for separating a mandrel section from a formed pipe section.

Referring more particularly to Fig. 1, the mandrel sections 1 are delivered by the conveyor 2 to the table or conveyor 3 from which they are brought into alinement with the line of mandrel sections passing to the wrapping and impregnating apparatus. The successive mandrel sections may be joined or connected end to end by flash welding but I prefer to join the mandrel sections by means of disposable bushings 4 two specific forms of which are shown in Figs. 2 and 3. The bushings 4 may be formed of metal, molded wood pulp or other suitable material and generally consist of cylindrical end portions 5 and 6 adapted to fit within the ends of the tubular mandrel sections and a substantially cylindrical middle portion 7 of larger diameter than the end portions and designed to fill the space between the ends of the mandrel sections. This central portion 7 may have a smooth cylindrical surface of the same size as the mandrel sections so as to give a smooth continuous cylindrical mandrel surface of uniform size but I prefer to provide the portion 7 with a readily distinguishable surface departure such as a bead 8 (Fig. 2) or a groove 9 (Fig. 3) which will produce a visible ridge or depression in the pipe formed on the mandrel and mark the location of the bushing. The mandrel formed by the joined mandrel sections 1 move forward (to the left in Fig. 1) supported by power driven rollers (not shown) through the wrappers 10 where, as illustrated, four layers of glass fibers are applied, each layer being formed by wrapping a ribbon of parallel fibers. The width of the ribbon is chosen with reference to the size of the mandrel so that each turn of the ribbon is contiguous to the previous turn when the angle of the fibers to a plane in the axis of the mandrel is 63.4°. As shown the strands of alternate layers are wrapped around the mandrel in opposite directions. The ribbons of glass fibers are wrapped around the mandrel by rotation of the ribbon feed around the mandrel, apparatus capable of effecting this operation being old and well known. Any desired number of layers of glass fiber may be applied. The wrapped mandrel then moves forward into the impregating and coating sleeve 11 where thermo-setting resin in fluid state is injected under pressure through the duct 12 and flows around the groove 13. The fluid resin displaces air from the fiber wrapping and tends to flow backward within sleeve 11. The extent of this backward movement of the resin is determined by the viscosity of the resin and the pressure applied. The rate of resin supply must of course be sufficient to keep the space between the mandrel and the sleeve filled with resin and this rate depends upon the rate of movement of the mandrel. The thickness of the pipe wall is determined by the difference between the diameter of the mandrel and the internal diameter of the sleeve 11.

The wrapped and resin coated mandrel moves forward from the sleeve 11 into the heater or oven 14 where the resin is heated and sets to a solid. The mandrel with the formed resin pipe then passes forward to the travelling cut-off 15 which is positioned to cut the pipe and mandrel at the bushings 4. The cut sections of pipe and mandrel then move to the mandrel extractor 16 from which the mandrel sections 1 are delivered to the conveyor or table 17 and the pipe sections 18 are delivered into a bin or conveyor 19, the mandrel sections 1 being returned to the conveyor 2 for a repetition of the above described procedure.

Various means and methods may be employed for separating the mandrel sections from the pipe sections. One method and apparatus which I have not illustrated is to heat the pipe to expand it and cool the mandrel to contract it while holding the pipe and pushing the mandrel out of it or holding the mandrel and pushing the pipe off of it. Apparatus capable of carrying out such a process readily may be provided by a skilled mechanic.

Another method and apparatus for separating the mandrel and pipe sections is illustrated in Fig. 5. This apparatus consists of the end plates 20 and 21 secured in parallel spaced relation by the bolts 22. The end plate 21 has a circular opening large enough to permit the mandrel section 1 to pass through it, said opening being surrounded by the flange 23 adapted to engage the end of the pipe section 18. The plate 20 is provided with an opening and a pipe 24 connected thereto for supplying a pressure fluid such as water. Internally the plate 20 is provided with a circular socket 25 adapted to receive the end of the pipe section 18 and the peripheral wall of this socket is provided with the groove and sealing ring 26 and 27 for providing a fluid-tight joint between the pipe and the socket. 29 is a circular piston or plunger having a portion 30 of such size as to extend into the mandrel 1. The peripheral wall of the plunger 29 is provided with a groove and packing ring 31 and 32 to make a fluid-tight joint between the mandrel and the plunger. The plunger has also a flange 33 which engages the end of the mandrel 1. When fluid is injected through the pipe 24 it forces its way between the mandrel section 1 and the pipe section 18, contracting the mandrel and expanding the pipe and thereby breaking the adhesion between them and at the same time the plunger 29 exerts pressure against the end of the mandrel section 1 and tends to force it out through the opening in the end plate 21 while the pipe section 18 is held stationary. It will be noted that due to the removal of the severed ends of the bushing 4, the ends of the pipe extend beyond the ends of the mandrel.

As will be seen from the foregoing disclosure I have provided a continuous method and apparatus for the production of fiber glass reinforced thermosetting resin pipe sections. The essential parts of the apparatus are a plurality of mandrel sections, means for uniting the mandrel sections into a continuous mandrel, means for wrapping the mandrel with unidirectional fiber glass, means for coating and impregnating the wrapped mandrel with thermosetting resin, means for heating and hardening the resin coating, means for severing the mandrel sections and at the same time severing the continuous pipe into sections, means for separating the mandrel sections from the pipe sections and means for returning the mandrel sections for re-use. I appreciate that a variety of specific embodiments of apparatus may be devised for carrying out the sequence of steps of the above described procedure. For example, split mold sections which may be applied to the wrapped mandrel and travel therewith while the resin is injected and set by heating and then removed and returned to the starting point for reuse may be substituted for the stationary sleeve 11. Also the rigid hollow mandrel sections may be substituted by a collapsible mandrel to facilitate separation of the mandrel from the pipe. A variety of well-known thermosetting resins may be used.

The scope of my invention is defined in the appended claims.

I claim:

1. Method for the manufacture of reinforced thermosetting resin pipe which comprises forming a continuous cylindrical mandrel from a plurality of axial mandrel sections joined in end-to-end relation, winding said mandrel with strands of fiber glass all lying at an angle of about 63.4° to all planes lying in the axis of the mandrel, enclosing the wrapped mandrel in a layer of thermosetting resin in fluid state, hardening said resin to produce the finished pipe, cutting said finished pipe into sections at the junction between mandrel sections and removing the mandrel sections from the finished pipe sections.

2. Method as defined in claim 1 in which the fiber glass strands are wound around the mandrel in the form of ribbons of parallel strands.

3. Method as defined in claim 1 in which the mandrel is wound with a plurality of layers of fiber glass strands, the strands of each layer crossing the strands of each adjacent layer at an angle of about 53.2°.

4. Method for the manufacture of reenforced thermosetting resin pipe as defined in claim 1 and which includes the further step of returning the mandrel sections to the forming point for the continuous mandrel subsequent to removal from the finished pipe sections.

5. Method for the manufacture of reinforced thermosetting resin pipe which comprises forming a continuous cylindrical mandrel, winding said mandrel with strands of fiber glass all lying at an angle of about 63.4° to all planes lying in the axis of the mandrel, enclosing the wrapped mandrel in a layer of thermosetting resin in fluid state, hardening said resin, to produce the finished pipe, cutting said pipe and mandrel into axial sections, and removing the mandrel sections from the pipe sections.

6. Apparatus for the manufacture of paper comprising a thermosetting resin matrix and fiber glass reinforcement, said apparatus including a plurality of cylindrical mandrel sections, means connecting said mandrel sections in end-to-end relation, said connecting means comprising disposable bushings having end portions adapted to fit into the ends of adjoining mandrel sections and a central cylindrical portion separating the end faces of adjoining mandrel sections, said central portion having readily distinguishable surface departure from the remainder of its surface which is reflected by a like departure in the surface of the pipe when formed on said mandrel sections and bushings, means for moving said connected mandrel sections longitudinally of the mandrel axis, means adjacent said connected mandrel sections for winding filamentary fiber glass around the same as they move longitudinally, means in the path of the wound mandrel sections for impregnating the same with thermosetting resin, means for hardening said resin, thereby to form a continuous fiber glass reinforced resin pipe, means for thereafter severing said pipe into sections comprising cutter means adjacent said pipe for cutting transversely through the pipe and the bushing at the central position thereof along a line coincident with said readily distinguishable surface departure, and means for separating each said pipe section from the mandrel section on which it was wound.

7. Apparatus as defined in claim 6 wherein the readily distinguishable surface departure in the central portion of said bushing is constituted by a peripheral bead which establishes a correspondingly positioned visible ridge in the continuous pipe.

8. Apparatus as defined in claim 6, wherein the readily distinguishable surface departure in the central portion of said bushing is constituted by a peripheral groove which establishes a correspondingly positioned visible depression in the continuous pipe.

9. Apparatus as defined in claim 6 wherein said winding means is disposed at an angle of about 63.4° to all planes lying in the axis of the mandrel.

10. Apparatus for forming continuous pipe on a mandrel characterized by the fact that said mandrel is constituted by a plurality of cylindrical mandrel sections and disposable bushings connecting adjacent mandrel sections together, said bushings comprising end portions adapted to fit into the ends of the adjoining mandrel sections, and a central cylindrical portion separating the end faces of adjoining mandrel sections, said central portion having a readily distinguishable surface departure from the remainder of its surface which is reflected by a like and correspondingly located departure in the surface of the pipe when formed on said mandrel sections and bushings thereby defining a line by which the pipe can be cut transversely into lengths each corresponding generally to the length of the mandrel section.

References Cited in the file of this patent

UNITED STATES PATENTS

| Number | Name | Date |
|---|---|---|
| 1,309,424 | Seiberling | July 8, 1919 |
| 1,355,525 | Baker | Oct. 12, 1920 |
| 1,447,767 | Vignier | Mar. 6, 1923 |
| 1,595,404 | Ingham | Aug. 10, 1926 |
| 1,633,593 | Larbalester | June 28, 1927 |
| 1,717,487 | Armstrong | June 18, 1929 |
| 2,352,533 | Goldman | June 27, 1944 |
| 2,422,234 | Goldman | June 17, 1947 |
| 2,467,999 | Stephens | Apr. 19, 1949 |
| 2,484,400 | Brown | Oct. 11, 1949 |
| 2,509,715 | Allen et al. | May 30, 1950 |
| 2,525,070 | Greenwald et al. | Oct. 10, 1950 |
| 2,571,717 | Howald et al. | Oct. 16, 1951 |
| 2,614,058 | Francis | Oct. 14, 1952 |

FOREIGN PATENTS

| Number | Country | Date |
|---|---|---|
| 627,255 | Great Britain | Aug. 4, 1949 |